United States Patent
Brown

(10) Patent No.: US 8,683,818 B2
(45) Date of Patent: Apr. 1, 2014

(54) FLUID INJECTING METHOD AND APPARATUS

(75) Inventor: Willilam Brown, Owatonna, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 290 days.

(21) Appl. No.: 12/873,370

(22) Filed: Sep. 1, 2010

(65) Prior Publication Data

US 2012/0048957 A1   Mar. 1, 2012

(51) Int. Cl.
*F25B 1/00* (2006.01)
(52) U.S. Cl.
USPC ................ 62/115; 62/126; 62/303
(58) Field of Classification Search
USPC ......... 62/303, 282, 284, 115, 126; 239/1, 569
See application file for complete search history.

(56) References Cited

U.S. PATENT DOCUMENTS

| | | | |
|---|---|---|---|
| 2004/0104244 A1* | 6/2004 | Cline et al. | 222/63 |
| 2004/0232173 A1* | 11/2004 | Saveliev et al. | 222/547 |
| 2006/0032870 A1* | 2/2006 | Murray et al. | 222/400.8 |
| 2007/0090132 A1* | 4/2007 | Williams et al. | 222/389 |
| 2008/0104976 A1* | 5/2008 | Guglielmetti et al. | 62/127 |

* cited by examiner

Primary Examiner — Mohammad M Ali
(74) Attorney, Agent, or Firm — Baker & Hostetler LLP

(57) ABSTRACT

A fluid injector includes a cavity in the fluid injector configured to receive a container of fluid to be injected by the injector; a controller configured to control the fluid injector, the controller further configured to monitor a condition of the fluid in the container and modify the operation of the fluid injector based on the condition of the fluid in the container; a valve assembly configured to control fluid from entering and leaving the fluid injector, the valve assembly operatively connected to the controller to be controlled by the controller; a sensor operatively connected to the controller and configured to sense at least one of an amount of fluid in the container and an amount of fluid exiting the container; and an input device configured to input to the controller how much fluid should leave the fluid injector.

20 Claims, 3 Drawing Sheets

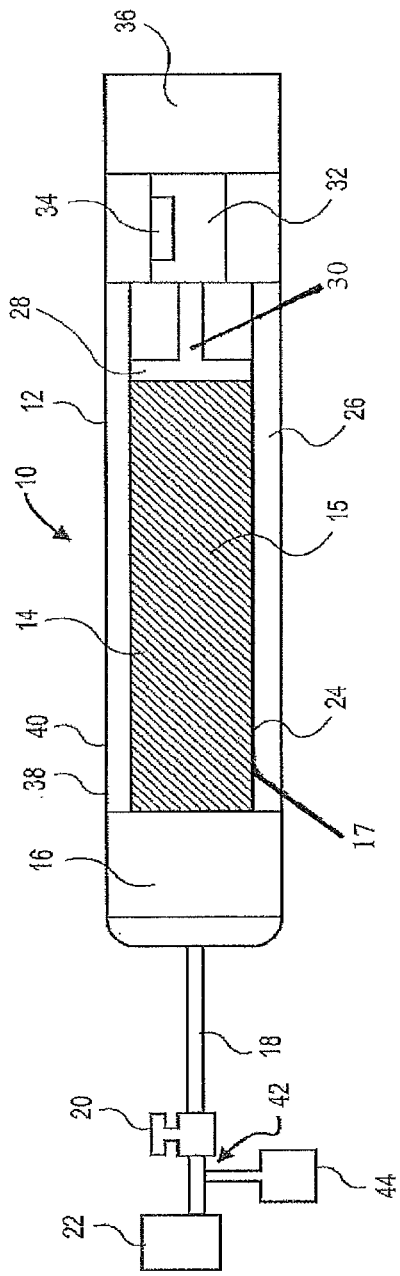
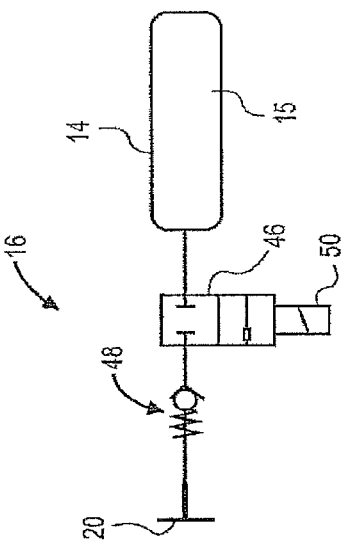
FIG. 1
FIG. 2

FLUID INJECTING METHOD AND APPARATUS

FIELD OF THE INVENTION

The present invention relates generally to fluid injectors. More particularly, the present invention relates to a method and apparatus for injecting oil and/or dye into an air conditioning unit.

BACKGROUND OF THE INVENTION

Modern compressors used in air conditioning units, for example for automobiles, may be high voltage compressors and do not fully insolate the windings of the compressors. As a result, the oil used to lubricate the compressors should be relatively free from moisture. Otherwise, moisture contained in the lubricating oil could potentially cause a problem in the high voltage compressor. In view of this situation, many automobile manufacturers are taking steps to ensure that the oil used in lubricating a compressor contains no or only relatively small amounts of moisture. Oil left in an opened container may be unsuitable due to moisture in the air contaminating the oil.

At least one automobile manufacturer requiring that the oil used when servicing the high voltage compressor comes from a never before opened container of oil. Thus, every servicing of a compressor requires a new container of oil. Such a situation can be not only expensive, but also wasteful. Therefore, it may be desirable to provide a method and apparatus that can address either or both of the above mentioned problems of providing relatively moisture free oil to a high voltage compressor and not having to waste left over oil used when a new container of oil is opened to service a high voltage compressor.

SUMMARY OF THE INVENTION

The foregoing needs are met, to a great extent, by the present invention, wherein in one aspect an apparatus and/or method is provided that in some embodiments provides relatively moisture free oil. Then the oil is injected into a compressor.

In one embodiment in accordance with the present invention, a fluid injector is provided. The fluid injector may include a cavity configured to receive a fluid to be injected by the injector; a controller configured to control the fluid injector, the controller further configured to monitor a condition of the fluid and modify the operation of the fluid injector based on the condition of the fluid; a valve assembly configured to control fluid from entering and leaving the fluid injector, the valve assembly operatively connected to the controller to be controlled by the controller; a sensor operatively connected to the controller and configured to sense at least one of an amount of fluid in the injector and an amount of fluid exiting the injector; and an input device configured to input to the controller how much fluid should leave the fluid injector.

In accordance with another embodiment of the present invention, a fluid injector is provided. The fluid injector may include: means for containing in the fluid injector configured to receive a means for containing fluid to be injected by the injector; means for controlling configured to control the fluid injector, the means for controlling further configured to monitor a condition of the fluid in the means for containing and modify the operation of the fluid injector based on the condition of the fluid in the means for containing; means for selectively permitting flow configured to control fluid from entering and leaving the fluid injector, the means for selectively permitting flow operatively connected to the means for controlling to be controlled by the means for controlling; means for sensing operatively connected to the means for controlling and configured to sense at least one of an amount of fluid in the means for containing and an amount of fluid exiting the means for containing; and means for receiving an input configured to input to the means for controlling how much fluid should leave the fluid injector.

In accordance with yet another embodiment, a method of injecting fluid is provided. The method may include monitoring a condition of a fluid in a container; indicating a fault if the condition of the fluid is outside a set parameter; receiving data regarding how much fluid to inject; and injecting an amount of fluid from the container according to the data.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a cut away side view of a fluid injecting apparatus in accordance with one embodiment of the invention.

FIG. 2 is a schematic diagram of an oil injecting apparatus including a valving system located at the front of the apparatus.

DETAILED DESCRIPTION

Figure 3:
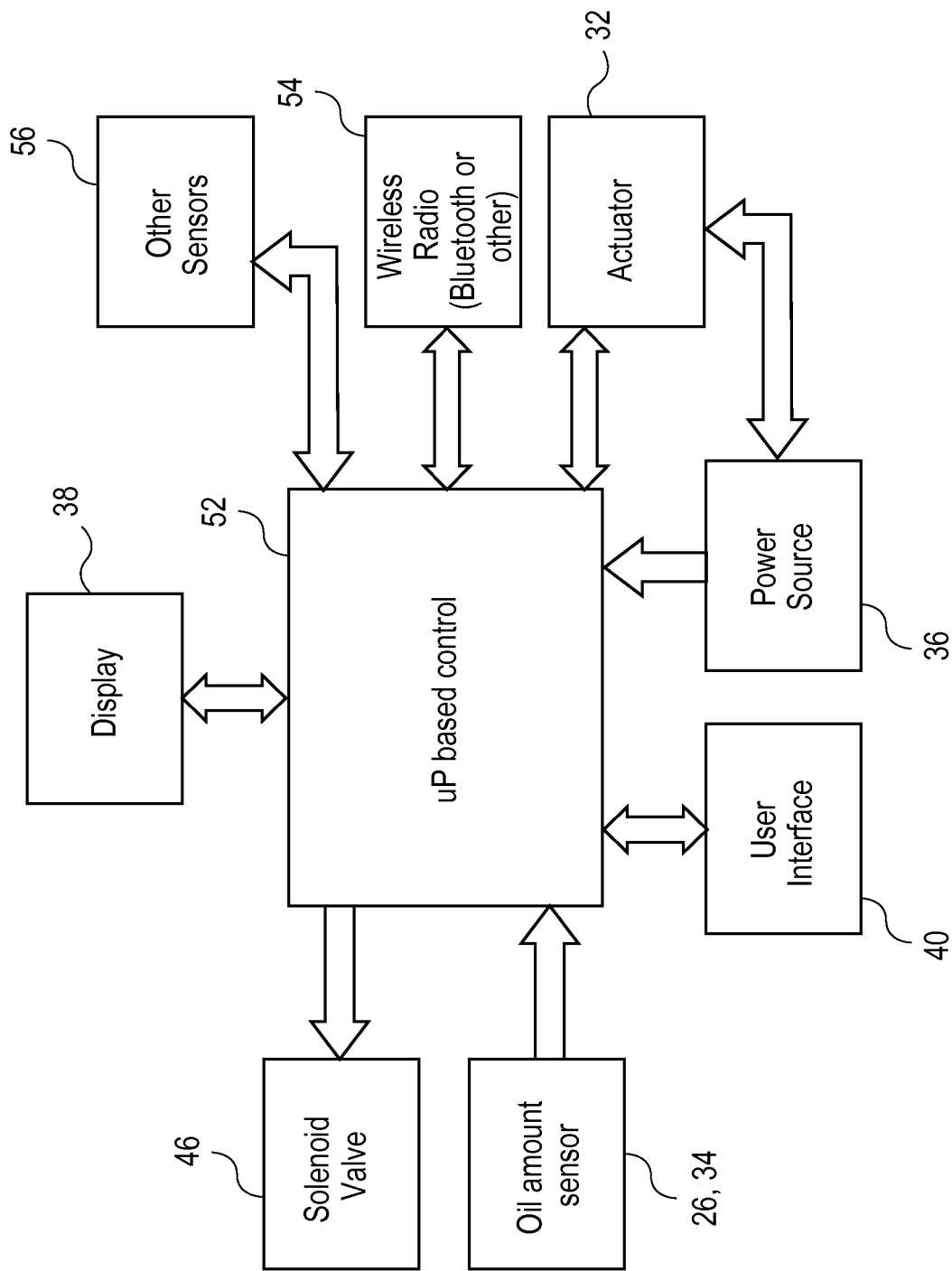
FIG. 3 is a schematic diagram of a control unit controlling various aspects of a fluid injecting apparatus in accordance with an embodiment of the invention.

Various embodiments in accordance with the invention will now be described with reference to the drawing FIGS. in which like reference numerals will refer to like parts throughout.

FIG. 1 illustrates a cut away side view of a fluid injecting apparatus in accordance with one embodiment of the invention. As described above, some automobile manufacturers are now requiring previously unopened containers of oil to be used when servicing high voltage compressors. In accordance with this policy, some automobile manufacturers are selling or recommending relatively small containers of oil in the form of cartridges that may be used in an apparatus to inject new oil. The apparatus shown in FIG. 1 may be designed to be compatible with cartridges of oil already available in the market. Other embodiments of the invention may be used with special proprietary cartridges of oil that may be available on the market at a future date. Still other embodiments of the invention may be compatible with oil that is placed into the injecting apparatus from a larger reservoir of oil.

FIG. 1 illustrates a cut away view of fluid injector 10. The fluid injector 10 includes a housing 12. The housing 12 provides a protective covering for the components contained within it and defines a cavity 17. A cartridge 14 may fit in the cavity 17 and maybe the aforementioned small container of oil that may be currently available or in the future on the market. The cartridge 14 may be prefilled with oil already determined to have a low moisture content. Exposure of oil to the atmosphere may cause the oil to be contaminated with moisture from the atmosphere. As result it may be important to maintain the oil contained within the cartridge 14 which may later be transferred into the high voltage compressor to remain sealed off from ambient conditions so that moisture from the atmosphere or from ambient conditions does not contaminate the oil. The cartridge 14 contains a fluid 15 which, in may instances, is lubricating oil. Dye or ultra violet dye on its own or mixed with oil may comprise the fluid 15. This dye may be used to help detect leaks.

The injector 10 further includes the valve assembly 16 at a front portion of the injector 10. A hose 18 provides a fluid connection between the valve assembly 16 and a fitting 20. The fitting 20 may be configured to mate with, and be coupled to, an air conditioning system 22 such as one in a vehicle. The fitting 20 may also be compatible with a air conditioning service unit 44 which can be attached to the air conditioning system in a vehicle 22. In such a case, a Tee connection 42 may be used to connect both the injector 10 the air conditioning service unit 44 to the air conditioning system in a vehicle 22.

Having the capability of connecting the injector 10 with an air conditioning servicing unit 44 may be desirable in certain situations because certain standards such as, SAE J2843 as being implemented for a refrigerant R-1234YF bans on board oil injection on air conditioning service units due to moisture concerns when used with high-voltage electric compressors. In the past, some air conditioning service units have had onboard oil injectors. However, in view of the standard as described above, the onboard injectors may no longer be available on onboard a/c service units. Therefore, a stand alone unit in addition to the injector 10 described above may be used. The injector 10 may be a small, portable handheld tool.

In some embodiments, the injector 10 may be configured to accept a cartridge 14 containing oil. The cartridge casing 24 may surround or define the cartridge 14. An optical sensor 26 may be located in the injector 10 to optically measure an amount of fluid 15 contained within the cartridge casing 24. Other sensors may be configured to detect a moisture content of the fluid 15.

In some embodiments, the cartridge casing 24 may be see-through or translucent in order to permit the optical sensor 26 to sense an amount of fluid 15 contained within the cartridge casing 24.

A plunger 28 is configured to urge against the fluid 15 contained within the cartridge casing 24. In some embodiments of the invention, the plunger 28 may urge against the fluid 15 directly. In other embodiments of the invention, the plunger 28 may urge against the cartridge casing 24. When the plunger 28 urges against the cartridge casing 24 or the fluid 15, the fluid 15 contained within the cartridge case 24 may be expelled out of the cartridge casing 24 and through the hose 28 to the air conditioning system in the vehicle 22.

The plunger 28 is equipped with a plunger rod 30 that serves to move the plunger 28 both against the fluid 15 or casing 24 or retract the plunger 28 from against the fluid 15 and/or casing 24. The plunger rod 30 is actuated with an actuator 32. The actuator 32 may be a motor such as an electric motor or may be a manually actuated. Examples of a manually actuated actuator 32 may include a lever such as a long trigger that allows a user to manually actuate the plunger rod 30 via the actuator 32. Other manual actuators may also be used. In instances where the actuator 32 is an electric motor, the injector 10 may be equipped with a battery 36 which is configured to operate the actuator motor 32.

In other embodiments of the invention, the injector 10 may be equipped with a plug-in cord which will allow the actuator 32 to be actuated by using line voltage when the plunger 10 is plugged into a wall socket.

The injector 10 may also be equipped with a plunger sensor 34. The plunger sensor 34 may be configured to sense a distance the plunger 28 or plunger rod 30 has moved. By sensing the distance that the plunger 28 or plunger rod 28 has moved, it can be determined how much fluid 15 has been expelled or injected into the air conditioning system in the vehicle 22.

In some embodiments in accordance with the invention, the injector 10 will be equipped with either of the optical plunger sensors 34 or the optical sensor 24 to measure the amount of oil. However, there maybe some embodiments in accordance with the invention equipped with some other type of sensors 56 (see FIGS. 3 and 4), such a sensor for determining the moisture content of the fluid 15. Other sensors may be used in embodiments that use cartridges 14 of fluid 15. These sensors 56 may detect whether the cartridge 14 has been opened before. For example, if the cartridge 14 is vacuumed packed, a sensor 56 may determine if the vacuum in the cartridge is broken as the cartridge 14 is opened by the injector 10. If the vacuum is not broken by the injector 10, it would mean that the cartridge 14 had not already been previously opened. These other sensors 56 could convey their sensed information to a microprocessor 52 described later below.

In some embodiments the other sensor(s) 56 in combination with the microprocessor 52 could track how long the cartridge 14 has been opened after the cartridge 14 has entered the injector 10. Tracking the time of how long the cartage 14 has been opened could be used in an algorithm carried out by the microprocessor 52 to determine if the fluid 15 in the cartridge 14 is acceptable to be used. The algorithm could include factors such as the temperature and the humidity of the air ambient air to the injector 10 as well as an amount of time the cartridge 14 has been opened to determine if the fluid 15 is acceptable to be used.

The sensors 24 and 34 conduct a similar function of measuring either an amount of oil or amount that the plunger rod 30 or plunger 28 has moved to estimate the amount of fluid 15 that has been injected into an air conditioning system 22 in a vehicle. The way the sensors 24 and 34 are used in making this estimation will be discussed further below with respect to FIGS. 3 and 4.

Turning now to FIG. 2, FIG. 2 is a schematic diagram of the cartridge 14 containing the fluid 15. The valve assembly 16 and the fitting 20 are shown. The cartridge 14 and the fluid 15 are shown to be fluidly connected to the valve assembly 16. The valve assembly 16 may include a solenoid valve 46 that may be operably connected to a solenoid 50. The solenoid 50 may be receive its power from the battery 36 in embodiments that use a battery 36. In other embodiments that use a cord to plug the injector 10 into a line voltage, the solenoid 50 may be actuated or provided power by the line voltage. The solenoid 50 may have a biased position that does not provide a fluid connection between the fluid 15 and the fitting 20. However, when the solenoid 50 is actuated, the solenoid 50 actuates the solenoid valve 46 to provide a fluid connection between the fluid 15 and the fitting 20.

In some embodiments of the invention, the amount of fluid 15 injected into a vehicle may be estimated using time. If the viscosity of the oil is known, than the microprocessor 52 may calculate how long the solenoid 50 needs to remain open to let a desired amount of fluid 15 into a vehicle.

A check valve 48 may be located between the oil cartridge 14 and the fitting 20 to ensure the fluid 15 does not move backwards from the fitting 20 into the cartridge 14.

FIG. 3 is a block diagram showing a microprocessor 52 used to control various aspects of the injector 10. The microprocessor 52 is connected to a display 38. The display 38 allows a viewer to view various aspects of the injector 10. For example, the display 38 may show an amount of oil that needs to be injected into an air conditioning system in a vehicle 22. The display 38 can also show how much fluid 15 is contained within the cartridge 14. The display 38 could also show various aspects and conditions of the injector 10 including whether or not the injector 10 is on and in condition to operate or if there is some faults associated with the injector 10.

As shown in FIG. 3, the microcontroller 52 is operably connected to the solenoid valve 46 to control the solenoid valve 46 to selectively permit fluid 15 from the cartridge 14 to move through the hose 18 to the air conditioning system of the vehicle 22. The microcontroller 52 is operably connected to the sensors 26 and 56. As discussed above, the sensors 26, 34 and 56 can sense an amount of fluid or oil contained within the cartridge 14, measure a distance that the plunger 38 or plunger rod 20 moves via the actuator 32 how much moisture is in the fluid 15, whether a cartridge 14 has been previously opened or any other condition of the fluid 15. While obtaining the information of how much the plunger 38 or plunger rod 20 has moved the microcontroller 52 is configured to calculate how much fluid 15 has been moved from the cartridge 14 to the air conditioning system of the vehicle 22.

The microcontroller 52 may also be operably connected to a user interface 40. The user interface 40 may include switches or buttons that allow a user to operate the injector 10. The user interface 40 may be a keyboard or an other suitable interface. Examples of features the user interface 40 may allow the user to manipulate include increasing or decreasing an amount of fluid 15 to inject. Buttons labeled with up or down arrows may be used of any other labels may be used to provide other suitable user input.

The user interface 40 may also permit the user to override some of the settings of the injector 10. For example, the user interface 40 may allow the user override settings to insert old fluid 15 or an old cartridge 14 into the injector 10, whereas the injector 10. In other embodiments of the invention the user interface 40 may not permit a user to over ride these settings.

The user interface 40 may allow a user to indicate whether the fluid 15 contained within the cartridge 14 is oil or a dye. The microcontroller 52 may alter how it controls the actuator 32 depending on whether the fluid 15 is an oil or dye.

A power source 36 is also operably connected to the microcontroller 52 in order to provide power to the microcontroller 52. The actuator 32 is also operably connected to the microcontroller 52 so that the microcontroller 52 can control the actuator 32 to control how much it actuates the plunger 28 or plunger rod 30.

A communication device 54 such as a wireless radio, Bluetooth or other similar system may be operably connected to the microcontroller 52. A communication device 54 may be configured to communicate with an air conditioning service unit 44. For example, an air conditioning service unit 44 may be used to drain the refrigerant from a system. When the refrigerant is drained from an air conditioning system oil may also be drained. A servicing unit 44 may measure how much oil has been drained from the system and may communicate this amount to the injector 10 via the communication device 54. The communication device 54 may then input this amount into the microcontroller 52. The microcontroller 52 may then control the actuator 32 to input a similar amount of oil into the air conditioning system in the vehicle 22 as it has been removed by the air conditioning service unit 44. The microcontroller 52 may increase or decrease this amount based on additional information provided either by the interface 40 or by routines programmed onto the microcontroller 52.

Figure 4:
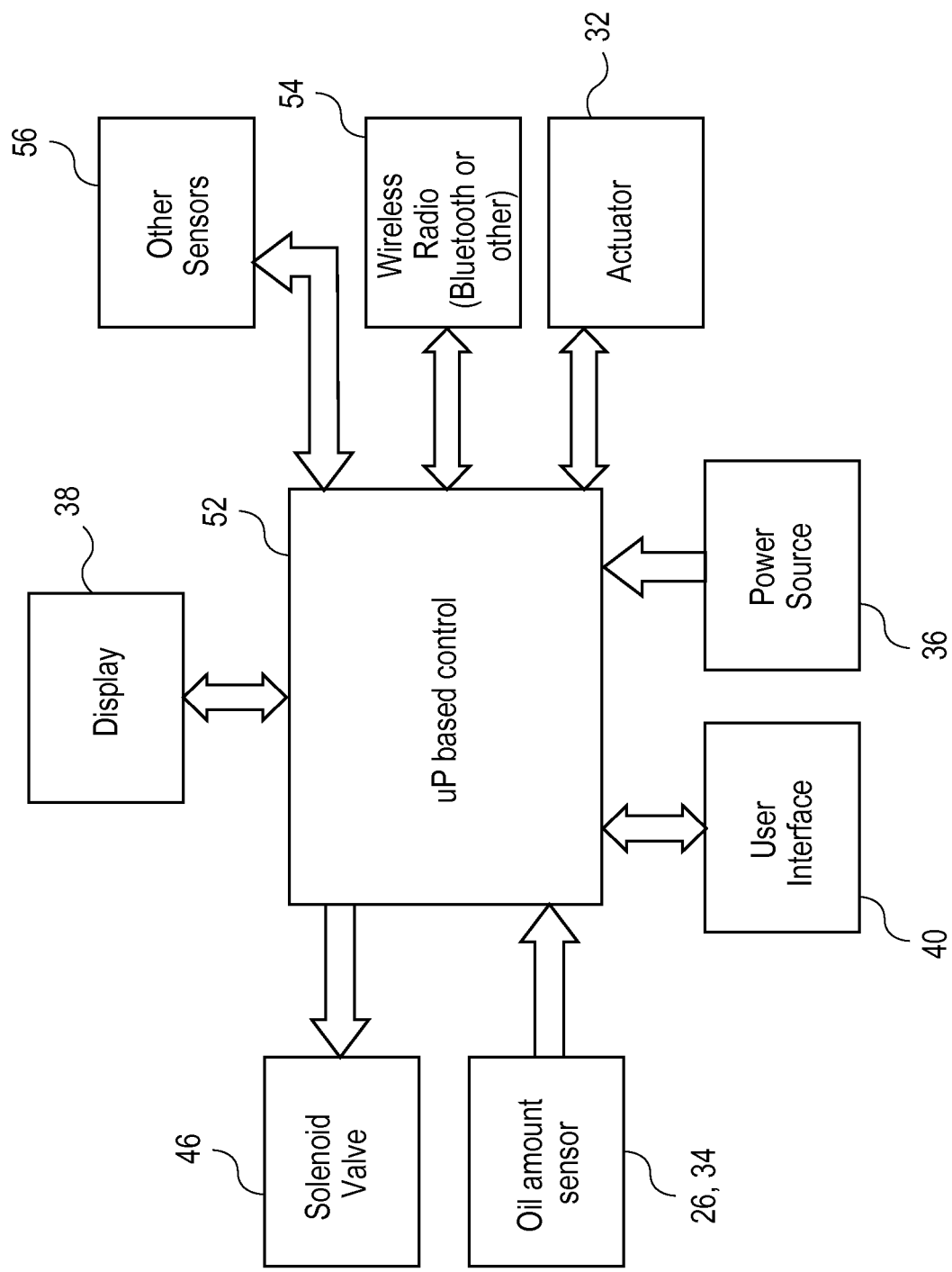
FIG. 4 is a schematic diagram of a control unit controlling various aspects of a fluid injecting apparatus in accordance with another embodiment of the invention.

The block diagram shown in FIG. 4 is similar to that as shown in FIG. 3. For example, the microcontroller 52 is operably connected to display 38, a solenoid valve 46, sensors 26, 34 and 56 a user interface 40, a power source 36, an actuator 32, and a communication device 54 such as a wireless radio or Bluetooth device. The difference between the block diagram shown in FIG. 3 and FIG. 4 is that the power source 36 is not connected to the actuator 32 in FIG. 4 as it is in FIG. 3. The block diagram shown in FIG. 4 is for a manually operated actuator 32.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fluid injector for use with an air conditioning (A/C) servicing machine comprising:
    a cavity in the fluid injector configured to receive a container containing a fluid to be injected by the injector;
    a plunger configured to have one surface that contacts and moves the fluid out of the fluid injector;
    a controller configured to control the fluid injector and the plunger, the controller further configured to monitor a condition of the fluid and modify an operation of the fluid injector based on the condition of the fluid;
    a valve assembly configured to control fluid from entering and leaving the fluid injector, the valve assembly operatively connected to the controller and controlled by the controller;
    a sensor operatively connected to the controller and configured to sense an amount of fluid exiting the injector; and
    an input device configured to send an input to the controller the amount of fluid that leaves the fluid injector and enters the A/C servicing machine.

2. The fluid injector of claim 1, further comprising a vacuum sensor that determines if a vacuum in the container is broken as the container is opened by the fluid injector.

3. The fluid injector of claim 1, further comprising a moisture sensor configured to detect a moisture content of the fluid and, wherein the condition is the moisture content of the fluid.

4. The fluid injector of claim 1, wherein the input device includes a communication device configured to communicate with the A/C servicing machine and receive information from the A/C servicing machine regarding an amount of oil removed from a refrigerant of an A/C system.

5. The fluid injector of claim 1, wherein the input device includes at least one of buttons and a touch screen and configured to allow a user to input the amount of fluid to be injected by the fluid injector.

6. The fluid injector of claim 1, wherein the controller is programmed to modify a parameter of how the controller controls the fluid injector based on the condition of the fluid.

7. The fluid injector of claim 1, further including a display operatively connected to the controller and configured to display various conditions of at least one of the fluid injector and the fluid in the fluid injector.

8. The fluid injector of claim 1, wherein the plunger is attached to a rod and the controller controls the flow of fluid out of the fluid injector.

9. The fluid injector of claim 8, further including a power source operatively connected to the rod and configured to move the rod.

10. The fluid injector of claim 8, wherein the rod is manually operated by a user.

11. The fluid injector of claim 1, wherein the controller is configured to actuate the valve assembly to shut off flow of fluid from the fluid injector when a particular amount of fluid had been injected out of the fluid injector.

12. The fluid injector of claim 1, wherein the fluid injector is configured to open the container when the container is installed in the fluid injector.

13. The fluid injector of claim 2, wherein the controller is configured to not permit fluid to be injected from the fluid injector if the vacuum is broken.

14. The fluid injector of claim 1, further including a fitting fluidly connected to the valve assembly and configured to permit the fluid injector to fluidly connect to the A/C servicing machine.

15. A fluid injector for an A/C servicing machine comprising:
a cavity in the fluid injector configured to receive a container of fluid to be injected by the fluid injector;
a plunger configured to have one surface that contacts and moves the fluid out of the fluid injector;
a controller configured to control the fluid injector and the plunger, the controller further configured to monitor a condition of the fluid and modify an operation of the fluid injector based on the condition of the fluid;
a valve assembly configured to control fluid leaving the fluid injector, the valve assembly being controlled by the controller;
a vacuum sensor operatively connected to the controller, which is configured to determine if a vacuum in the container of fluid is broken as the container is opened by the fluid injector; and
an input device configured to input to the controller how much fluid is injected by the fluid injector, wherein the input device includes a communication device configured to communicate with the A/C servicing machine and receive information from the A/C servicing machine regarding an amount of fluid removed from a refrigerant.

16. The fluid injector of claim 15, further comprising a fitting configured to connect the fluid injector with the A/C servicing machine.

17. The fluid injector of claim 15, wherein the container is a cartridge and the fluid is oil or a dye.

18. A method of injecting a fluid into an air conditioning servicing machine comprising:
receiving a container containing a fluid in a cavity of a fluid injector;
injecting the fluid out of the fluid injector with a plunger;
controlling the fluid injector and the plunger with a controller;
monitoring a condition of the fluid in the container with the controller;
modifying an operation of the fluid injector with the controller based on the monitored condition;
controlling the fluid leaving the fluid injector and entering the A/C servicing machine with a valve assembly;
sensing the amount of fluid leaving the fluid injector with a sensor controlled by the controller; receiving an input from a user the amount of fluid that leaves the fluid injector; and communicating with the A/C servicing machine to receive an amount of the fluid removed from a refrigerant.

19. The method of claim 18, further comprising:
determining with a vacuum sensor if a vacuum exists in the container of fluid when it is opened by the fluid injector.

20. The method of claim 18, further comprising:
displaying on a display the condition of the fluid injector.

* * * * *